United States Patent
Gaide (10) Patent No.: US 10,671,136 B1
(45) Date of Patent: Jun. 2, 2020

(54) DETECTING AND RECOVERING FROM DEVICE FAULTS

(71) Applicant: Amazon Technologies, Inc., Seattle, WA (US)

(72) Inventor: Benjamin Thomas Gaide, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 15/875,413

(22) Filed: Jan. 19, 2018

(51) Int. Cl.
*G06F 1/00* (2006.01)
*G06F 1/28* (2006.01)
*G06F 1/3206* (2019.01)
*G06F 1/3287* (2019.01)

(52) U.S. Cl.
CPC .............. *G06F 1/28* (2013.01); *G06F 1/3206* (2013.01); *G06F 1/3287* (2013.01)

(58) Field of Classification Search
CPC ......... G06F 1/28; G06F 1/3287; G06F 1/3206
See application file for complete search history.

(56) References Cited

U.S. PATENT DOCUMENTS

| 2006/0174143 | A1* | 8/2006 | Sawyers | G06F 1/26 713/300 |
| 2012/0300526 | A1* | 11/2012 | Chuang | H02J 9/005 363/146 |
| 2013/0069617 | A1* | 3/2013 | Lee | H01R 31/065 323/318 |

* cited by examiner

Primary Examiner — Xuxing Chen
(74) Attorney, Agent, or Firm — Lee & Hayes, P.C.

(57) ABSTRACT

This disclosure describes techniques for detecting and recovering from faults in computing devices. The faults being detected may consume amounts of power within normal consumption parameters of the device, such as under upper-current protection limits of a power adapter. The power adapter may include components which prevent power from being supplied to the device if the current drawn by the device is not periodically reduced to less than a threshold amount of current. The device may include logic which causes the device to periodically reduce the current drawn from the power adapter to less than the threshold amount of current to reset a timer of the components of the power adapter. Thus, the device may periodically reduce the current drawn when the device is operating normally, but fail to reduce the current drawn when experiencing a fault, which results in the power adapter shutting off power to the faulted device.

20 Claims, 5 Drawing Sheets

DETECTING AND RECOVERING FROM DEVICE FAULTS

BACKGROUND

As the capabilities of computing devices continue to evolve, the power consumed by these devices during normal operation continues to grow as well. Often, computing devices and their electrical components draw power from a direct current (DC) power source. However, mains-power sources (e.g., wall outlets) generally supply power for consumer use as alternating current (AC) power because power is naturally generated as AC power. In light of this, computing devices often receive power supplied by mains-power sources from a power adapter which converts AC power to DC power, and may also step-down or otherwise change the voltage at which the DC power is supplied to the computing devices. To help detect and prevent device faults in computing devices, the power adapters may include current limiting circuits that impose an upper limit on the amount of current that can be delivered to the computing devices. While these current limiting circuits prevent amounts of current, and thus power, from being provided to computing devices that is over the upper current limits, device faults often occur in computing devices which draw amounts of current lower than the upper limit of the computing devices' normal operating limits, but nonetheless result in dangerous levels of power consumption for a device fault. Accordingly, dangerous device faults in computing devices can go undetected by current limiting circuits in power adapters, but still result in and potentially dangerous amounts of heat being created in the computing devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

As the capabilities and functionality of computing devices continue to evolve, the power consumed by these devices in normal operation continues to grow as well. Depending on the operations being performed by multi-capability computing devices (e.g., outputting audio data, presenting video data, executing a gaming application, etc.), the amount of power consumed by these computing devices may vary greatly such that relatively large amounts of power (e.g., 20 watts, 30 watts, etc.) may be normal in some operating situations, while problematic in device fault situations. Traditional power adapters for computing devices may include current limiting circuits that impose an upper limit on the amount of current that can be delivered to the computing devices to prevent device faults from drawing current outside of normal operation conditions. While these current limiting circuits prevent amounts of current, and thus power, from being provided to computing devices that is over these upper current limits, device faults often occur in computing devices which draw amounts of current lower than the upper limit of the computing devices' normal operating limits, but nonetheless result in dangerous levels of power consumption for a device fault. Accordingly, dangerous device faults in computing devices can go undetected by current limiting circuits in power adapters, but still result in large, and potentially dangerous, amounts of heat being created in the computing devices. For example, a computing device may have a shorted capacitor that behaves as a resistive load that may consume an amount of power that is within normal operation limits of the computing device (e.g., 20 watts), but when consumed by the shorted capacitor, may generate large amounts of heat that may result the computing device being destroyed, and potentially starting a fire.

This disclosure describes, at least in part, techniques for detecting and recovering from device faults in computing devices where the device faults consume amounts of power that are within normal device operation power parameters. In some examples, a power adapter that supplies power to a computing device may be modified to include a timer-based, low-current-limit component (e.g., integrated circuit (IC) or other hardware-based component) which prevents power from being supplied to the computing device if the amount of current drawn by the computing device is not periodically reduced to less than a threshold amount of current (e.g., 0 amperes (A), 100 mA, 200 mA, etc.). For instance, the low-current-limit component of the power adapter may automatically shut off power provided to the computing device periodically (e.g., every 15 seconds, 30 seconds, 60 seconds, etc.) unless a timer of the low-current-limit component is reset within the period of time. To reset the timer of the low-current-limit component, the computing device may include logic (e.g., software-based logic, firmware-based logic, hardware-based logic, or any combination thereof) which may reduce the amount of current drawn by the computing device to less than the threshold amount of power for a brief period of time before expiration of the timer of the low-current-limit component causes the power adapter to shut-off power to the computing device. For example, the timer in the low-current-limit component may need to be reset every 30 seconds to prevent the low-current-limit component from shutting off power to the computing device, and the logic in the computing device may briefly (e.g., 20 milliseconds (ms), 100 ms, 200 ms, etc.) drop the amount of current drawn by the computing device within the 30 second period of time (e.g., every 15 seconds, 20 seconds, etc.) to lower than the threshold amount of current. In this way, the computing device is able to "tell" or notify the power adapter that the computing device is operating normally based on the amount of current being drawn by the computing device.

The techniques described herein may be used to detect and/or recover from various types of device faults. In some examples, a computing device may experience a hardware-based fault, such as a shorted capacitor, where a faulted component of the computing device behaves as a relatively large resistive load that consumes relatively large amounts of power. As an example, a capacitor internal to the computing device may fail in a short such that the capacitor may be represented, or otherwise behave, as a resistor that sits at a relatively high resistance, depending on the device (e.g., 1 ohm, 2 ohms, etc.). In such an example, the shorted capacitor may consume relatively high amounts of power depending on the device (e.g., 10 watts, 20 watts, etc.) that generates significant amounts of heat which may destroy the computing device, and potentially start a fire. However, if the computing device performs normal operations, such as outputting audio and/or video, that consume upwards of 20 watts, any upper-current-limiting component in the power adapter that places an upper limit on the amount of current that can be drawn by the computing device to result in under 20 watts being consumed will not detect or prevent the potentially dangerous hardware-based fault. Using the techniques described herein in the hardware-based fault example, the logic included on the computing device to periodically lower the amount of current drawn from the power adapter to less than the threshold amount of current to reset the timer on the low-current-limit component may be unable to lower amount of current drawn due to the hardware-based fault drawing large amounts of current. In such an example, the timer on the low-current-limit component would then expire and shut-off power to the computing device. In this way, the techniques described herein prevent hardware-based faults from drawing amounts of current from the power adapter that are under the upper current limit, but are nonetheless dangerous amounts of current.

In another example, a computing device may experience a firmware-based fault that causes the computing device to stop operating correctly, or "freeze" up. In such firmware-based fault examples, the logic the logic included on the computing device to periodically lower the amount of current drawn from the power adapter to less than the threshold amount of current to reset the timer on the low-current limit component may be unable to lower amount of current drawn as the firmware on the computing device is frozen or otherwise at least partially non-responsive. In such examples, the timer on the low-current-limit component would then expire and shut-off power to the computing device. In this way, the techniques described herein prevent firmware-based faults from drawing amounts of current from the power adapter that are under the upper current limit, but are nonetheless dangerous amounts of current, and also cause the computing device to potentially recover from the firmware-based fault by forcing a reboot of the firmware of the computing device after shutting off power to the device.

The techniques described herein for detecting and recovering from device faults in computing device may be performed in multi-function computing devices and while the computing devices are performing one or more operations. For instance, the logic included in the computing devices may cause the computing devices to stop drawing current, or to draw less than a threshold amount of current, while the computing devices perform one or more operations. As an example, a computing device may be performing one or more of outputting audio data using a speaker at least partially powered by the computing device, presenting video data using a display at least partially powered by the computing device, conducting a gaming application session (e.g., receiving inputs, outputting video data, outputting audio data, etc.), streaming data over networks with other devices, and/or other operations while the logic on the computing device lowers the amount of current drawn.

In some examples, depending on the activity being performed, the logic may further be configured to perform various optimization techniques to determine at what time to lower the amount of current drawn to reset the timer in the low-current-limit component of the power adapter. For instance, in examples where a computing device is outputting audio data using a speaker, the computing device may include one or more buffers which store at least a portion of the audio data prior to the audio data being output. The audio data may be stored in the buffers for a short period of time before the audio data is output using the speaker (e.g., 15 seconds, 30 seconds, etc.). In such examples, the logic in the computing device may be configured to identity segments, or portions, of the stored audio data that, when output using the speaker, use relatively lower amounts of power compared to other audio data. For instance, the logic may be configured to identify segments of an audio signal having lower than a threshold signal amplitude, and cause the computing device to lower the amount of current drawn to less than the threshold amount of current while the low-amplitude segment of the audio data is output using the speaker. In this way, the components that supply power to the device and speaker (e.g., capacitors) have a lesser load to supply power to while the computing device briefly is drawing little or no power from the power adapter. In this way, the user experience of listening to the audio data may be substantially maintained as the charge on the capacitors may sufficient to output the audio data having the low signal amplitude when the little or no current is being drawn from the power adapter by the computing device.

Thus, the techniques described herein may facilitate detecting and recovering from device faults in computing devices where the device faults consume amounts of power that are within normal device operation power parameters. As described above, the power adapter may only be modified by adding a hardware-based, low-current-limit component to the power adapter. In this way, rather unsophisticated power adapters may be configured to detect and recover from faults that they may not have been able to detect previously. In some examples, power adapters have been designed to include a microprocessor that includes firmware- and/or software-based logic configured to communicate with a computing device to determine whether faults exist. However, including a microprocessor in the power adapter not only increases the cost of designing and manufacturing power adapters, but also increases the complexity, and likelihood of failure, in the power adapters. The techniques described herein enable unsophisticated power adapters (e.g., lacking a microprocessor) to determine whether faults are occurring in a computing device that draws power from the power adapter by implementing a hardware-based, low-current-limit component. However, it is also contemplated that the techniques described herein could similarly be implemented in a microprocessor-based power adapter.

While the techniques described herein are primarily with respect to a computing device drawing DC power from an external power adapter, the techniques may be equally applied in any type of device configuration where a power supply/adaptation component is configurable to selectively shut-off power to a load computing device. For instance, a power adapter may be installed internal to the computing device itself, installed at a plug-in to mains power, or any other location. Further, the power adapter may be any type of adapter, such as an AC-to-AC power adapter step-up and/or step-down power adapter, an AC-to-DC adapter, an AC-to-DC step-up and/or step-down power adapter, a DC-to-AC power adapter, a DC-to-AC step-up and/or step-down power adapter, etc. In some examples, the power adapter need not necessarily modify the power being supplied from a power source to the computing device, but may simply be the hardware-based, low-current-limit component electrically disposed between the computing device and the power source to selectively shut-off power to the computing device.

As shown below, certain current, voltage, and/or power values are used to describe this invention. However, the techniques described herein are generally applicable for any configuration of devices, and for any range and type of current, voltage, and/or power (e.g., AC values, DC values, low-power devices, high-power devices, etc.).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
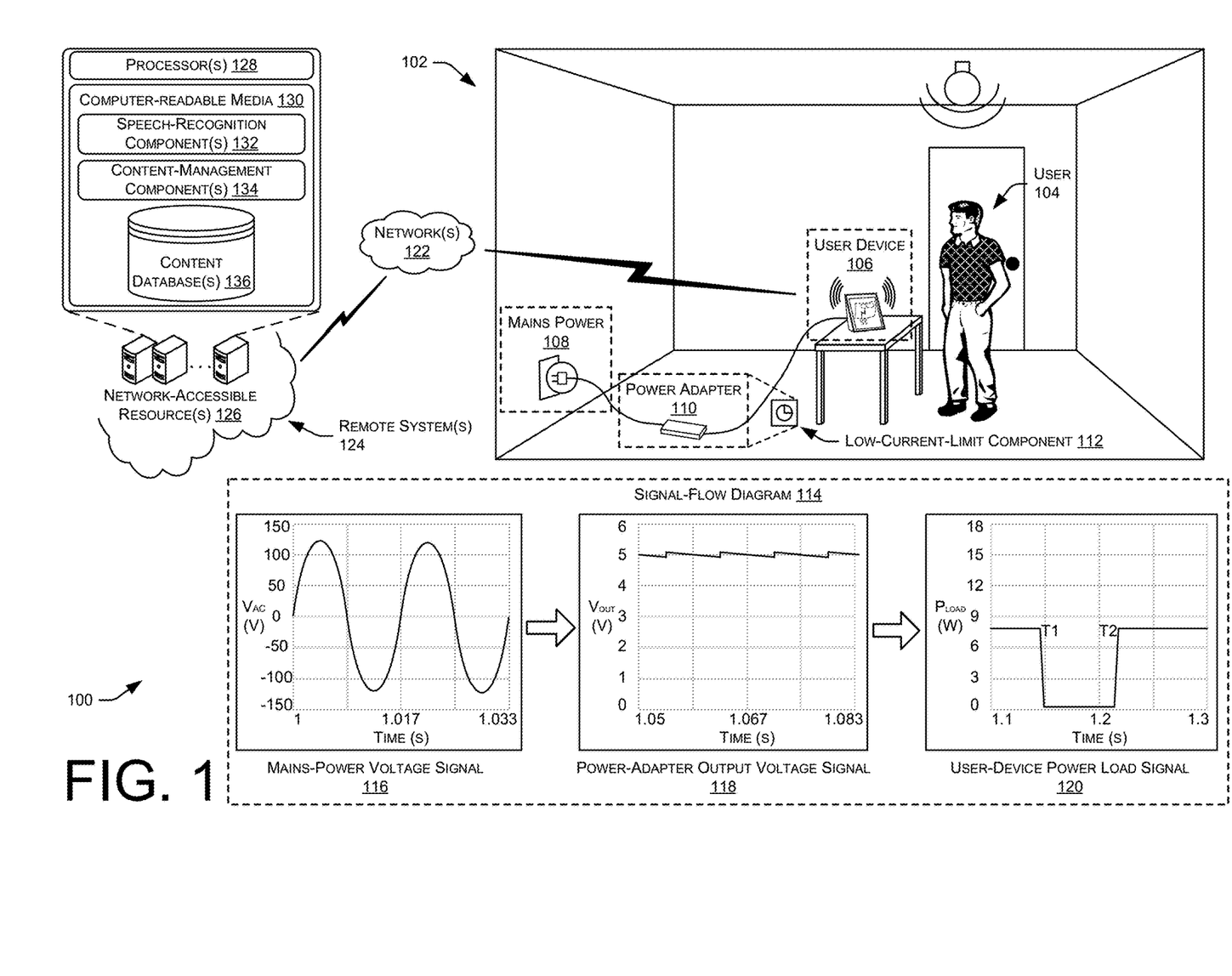
FIG. 1 illustrates a schematic diagram of an illustrative environment in which a user device is provided with power from a power adapter which converts power received from mains power to an appropriate power supply for the user device. The user device is configured to periodically lower the amount of current drawn from the power adapter as a means to indicate to components of the power adapter that the user device is operating normally.

FIG. 1 illustrates a schematic diagram 100 of an illustrative environment 102 in which a user 104 interacts with a user device 106 that receives power from mains power 108 after being adapted or modified by a power adapter 110 into a usable format by the user device 106. In some examples, the mains power 108 may comprise an outlet in a building which provides power from a power grid in a form and at a voltage that is unusable for the user device 106 (e.g., 110 volts AC, 220 volts AC, etc.). Accordingly, the power adapter 110 may include various components (e.g., transformers, rectifiers, converters, amplifiers, capacitors, etc.) configured to modify or otherwise adapt the power provided by mains power 108 into a usable format for the user device 106 (e.g., 5 volts DC, 10 volts DC, etc.). However, any type of power supply may be provided at the mains power 108, and any type of components may be included in the power adapter 110.

According to techniques described herein, the power adapter 110 may further include a low-current-limit component 112 comprising one or more electrical components configured to determine whether or not the user device 106 has reduced the amount of current drawn through the power adapter 110 to lower than a threshold amount of current. In some examples, the low-current-limit component 112 may include a timer or other timing component that causes the low-current-limit component 112 to stop providing power to the user device 106 if the amount of current drawn by the user device 106 is not reduced or dropped to lower than a threshold amount of current within a period of time set by the timer. For instance, the timer of the low-current-limit component 112 may need to be reset periodically (e.g., every 15 seconds, 30 seconds, etc.) to prevent the low-current-limit component 112 of the power adapter 110 from shutting off power provided to the user device 106. If the user device 106 reduces the amount of current being drawn from the power adapter 110 within the time period set by the timer of the low-current-limit component 112, then the timer may be reset and continue to allow the user device 106 to draw current from the power adapter 110.

FIG. 1 illustrates an example signal-flow diagram 114 which depicts voltage signals and power signals as power flows from mains power 108, through the power adapter 110, and to the user device 110. For example, the signal-flow diagram 114 illustrates that the mains-power voltage signal 116 for the mains power 108 comprises an alternating current waveform that sits at a nominal voltage of about 120V AC. After the mains-power voltage signal 116 moves through the components of the power adapter 110, the components of the power adapter 110 may have changed the 120V AC signal to roughly 5V DC as illustrated by the power-adapter output voltage signal 118. As described in more detail with respect to FIG. 2, the power adapter 110 may include hardware components, such as transformers, rectifiers, buck converters, boost converters, diodes, capacitors, and/or other types of electrical and/or electromechanical devices configured to adapt power into a usable format for the user device 106. In the example illustrated, the power-adapter output voltage signal 118 depicts the voltage at which the power adapter 110 provides power to the user device 106, which is illustrated as a 5V DC voltage signal 118. Further, the signal-flow diagram 114 illustrates a user-device power load signal 120 which depicts a power signal representing power consumed by the user device 106. As shown, the user-device power load signal 120 shows that the user device 106 is consuming a relatively constant amount of power of roughly 8 W DC. However, from time T1 to time T2, the user device 106 lowered the amount of current, and thus power, drawn from the power adapter 110 for a short period of time (roughly 0.6 seconds). In this way, the user device 106 is able to reset the timer of the low-current-limit component 112 to prevent the low-current-limit component 112 from shutting off power to the user device 106. Stated otherwise, the user device 106 is able to "notify" the power adapter 110 that the user device 106 is functional (e.g., no hardware-based faults and/or firmware-based faults), is operating under normal conditions, and that no fault needs to be cleared, prevented, or recovered from. By lowering the amount of current, and thus power, for the period of time between T1 and T2, the user device 106 may cause the timer of the low-current-limit component 112 to reset the timer, and allows the user device 106 to continue to draw current from the power adapter 110. As described in more detail with respect to FIG. 3, the user device 106 may include logic to periodically lower the amount of current, and thus power, drawn or otherwise received from the power adapter 110 to reset the timer of the low-current-limit component 112 before the timer causes the power adapter 110 to shut off power to the user device 106.

Generally, the user device 106 may comprise any type of device 106 and have varying functions or operations. For instance, the user device 106 may comprise a handheld device or other mobile device, such as a smartphone, a tablet computer, a media player, a personal computer, a wearable device, various types of accessories, and so forth. The user device 106 may include or be communicatively coupled to one or more different types of components for performing different functionalities including, but not limited to, a display for presenting video data or other image data, a speaker for outputting audio data, a microphone for capturing sound in the environment 102, network interfaces for communicating data over networks (e.g., wired networks, wireless networks, etc.), sensors for capturing various sensor data (e.g., proximity sensors, imaging sensors, accelerometers, gyroscopes, temperature sensors, or any other type of sensors), associated input devices (e.g., keyboard, mouse, joystick, and so forth), and/or any other type of components.

In some examples, the user device 106 may comprise a voice-enabled device that is able to interact with the user 104 through speech, such as voice commands. For instance, the user 104 may issue a command to the user device 106 via a speech utterance to perform an operation, such as turning on/off an appliance, streaming music, performing a telephone call, etc. In some examples, the user device 106 may be a sophisticated voice-enabled device 106 and include components for determining an intent of the voice command of the user 104, and further determining an operation that the user device 106 is to perform based on the intent of the voice command of the user 106. However, the user device 106 may, in some examples, have relatively low functionality in terms of voice processing and may simply perform some types of pre-processing on audio data representing the voice commands of the user 106. For instance, the user device 106 may merely serve as an interface or "middle man" between a remote system, or server, and the user 104. In this way, the more intensive processing used in speech processing may be performed using large amounts of resources of remote services.

Accordingly, the user device 106 may include network interfaces which configure the user device 106 to communicate over one or more networks 122 to send and receive data with various computing devices, such as one or more remote systems 124 which may include various network-accessible resources 126. In some examples, the remote system(s) 124 may be a speech processing system (e.g., "cloud-based system," "software as a service (SaaS)," "network-accessible system," etc.) which receives audio data from the user device 106 representing a voice command of the user 104. For instance, the user device 106 may receive a "wake" trigger (e.g., wake word, button input, etc.) which indicates to the user device 106 that the user 104 is speaking a voice command, and the user device 106 may begin streaming, via a network interface and over the network(s) 122, audio data representing the voice command as captured by one or more microphones of the user device 106 to the remote system(s) 124.

The network(s) 122 which connect the user device 106 to the remote system(s) 124 may represent an array or wired networks, wireless networks (e.g., WiFi), or combinations thereof. The remote system(s) 124 may generally refer to a network-accessible system—or "cloud-based system"—implemented as a computing infrastructure of processors, storage, software, data access, and so forth that is maintained and accessible via the network(s) 122, such as the Internet. Cloud-based systems may not require end-user knowledge of the physical location and configuration of the system that delivers the services. As illustrated, the remote system(s) 124 may comprise the network-accessible resource(s) 126, such as servers. Multiple such resources 126 may be included in the system(s) 124. For instance, the network-accessible resource(s) 126 may include one or more processors 128, which may include a central processing unit (CPU) for processing data and computer-readable instructions, and computer-readable storage media 130 storing the computer-readable instructions that are executable on the processor(s) 128. The computer-readable media 130 may individually include volatile random access memory (RAM), non-volatile read only memory (ROM), non-volatile magnetoresistive (MRAM) and/or other types of memory, and may store one or more speech-recognition component(s) 132, such as an automatic speech-recognition (ASR) component or system and a natural-language-understanding (NLU) component or system.

In some examples, the ASR component or system of the speech-recognition component(s) 132 may receive audio data from the user device 106 that represents a voice command and begin performing ASR on the audio data to generate text data that represents words of the voice command. Further, the NLU component or system of the speech-recognition component(s) 132 may then use NLU to identify one or more user voice commands, and intents of those voice commands, from the generated text data. Finally, the speech-recognition component(s) 132 may determine an instruction or command to perform, or for the user device 106 to perform, based on the intent of the voice commands. For instance, the speech-recognition component(s) 132 may determine that the user 104 is requesting that the user device 106 stream music, control a secondary device (e.g., turn on a TV, conduct a phone call using a cell phone, etc.), output a video on a display, and so forth. The speech-recognition component(s) 132 may then cause the remote system(s) 124 to relay the command or instruction to the user device 106.

In some examples, the computer-readable media 130 may further store one or more content-management components 134 that are configured to manage content stored in one or more content databases 136. The content-management component(s) 134 and the content database(s) 136 may be stored at a single location, or across different locations and in different arrangements of computing devices of the network-accessible resource(s) 126. In some examples, the content-management component(s) 134 may be associated with a same operator of the speech-recognition component(s) 132 and manage or obtain content from the content database(s) 136 based on commands determined by the speech-recognition component(s) 132. For instance, the speech-recognition component(s) 132 may determine that a voice command of the user 104 detected by the user device 106 is a request to stream music that is stored in the content database(s) 136. The content-management component(s) 134 may receive an indication of that request, and an indication of the music, and cause the user device 106 to stream music from the content database(s) 136. For instance, the content-management component(s) 134 may be executable by the processor(s) 128 to identify a storage location in the content databases(s) 136 where the desired music is stored. In some examples, this may comprise the content-management component(s) 134 requesting a third-party device or system of devices (e.g., Pandora, Spotify, etc.) for a universal resource location (URL) which indicates the location at which the music is stored that the user device 106 is to stream. The content-management component(s) 134 then sends an indication of the URL to the user device 106, which in turn accesses and begins streaming the audio data from the content database(s) 136 and outputs the audio data using a speaker of the user device 106. However, the content database(s) 136 may store any types of data (e.g., video data, image data, gaming data, etc.) and stream or otherwise send the data to the user device 106.

Figure 2:
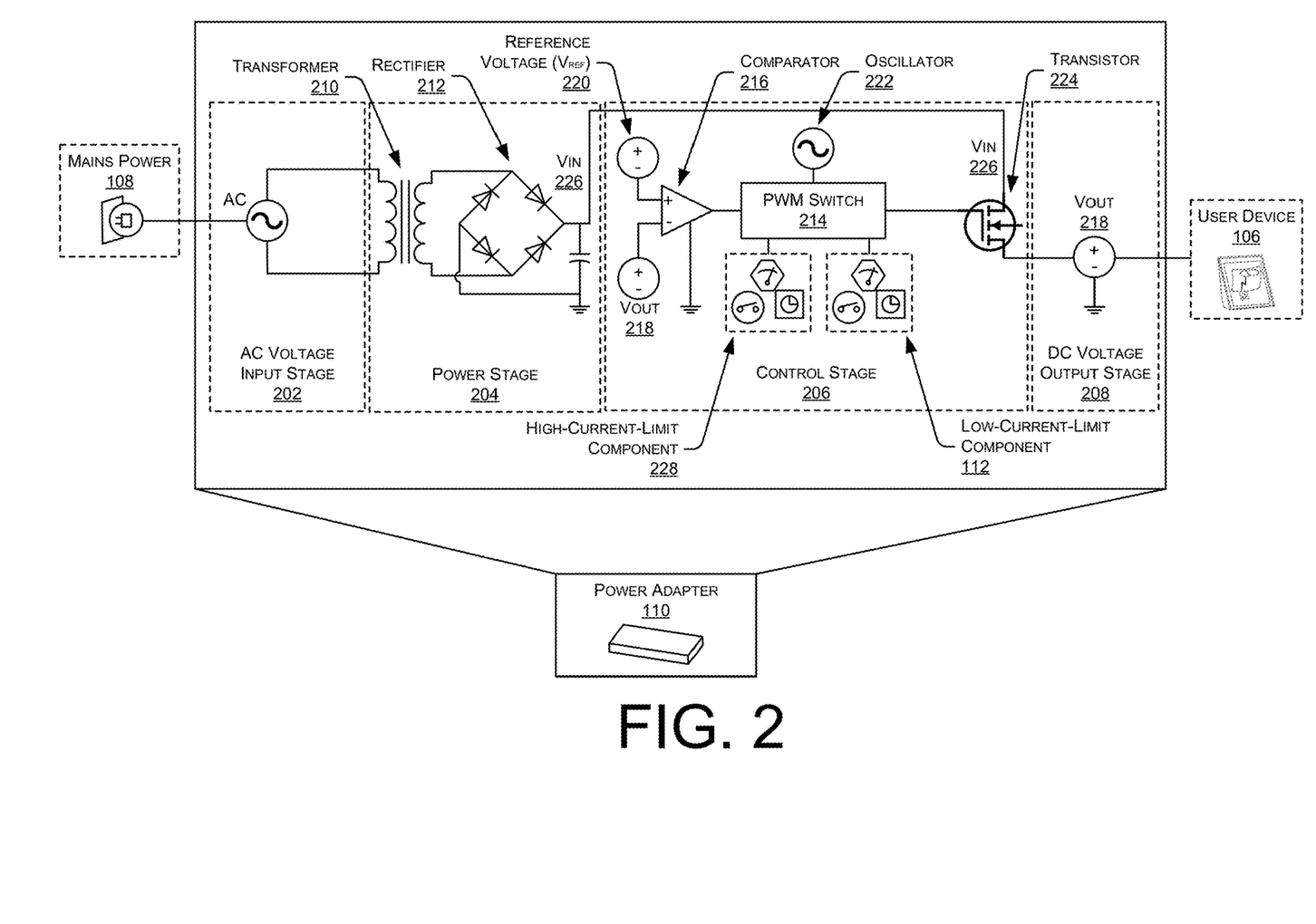
FIG. 2 illustrates a block diagram of an example architecture of a power adapter that includes components for determining, based on an amount of current drawn by a user device, whether the user device is experiencing a fault.

FIG. 2 illustrates a block diagram of an example architecture of a power adapter (e.g., power adapter 110), that includes components for determining, based on an amount of current drawn by a user device (e.g., user device 106), whether the user device is experiencing a fault. The components of the power adapter 110 shown in FIG. 2 are merely an exemplary example of components that may be included in the power adapter 110. However, various components may be added, removed, modified, and so forth. However, the power adapter 110 may include the low-current-limit component 112 that is configured to determine whether the user device 106 reduced the amount of current drawn through the power adapter to lower than the threshold amount of current, and shut off power provided by the power adapter 110 to the user device 106 if the low-current-limit component 112 does not detect lower than the threshold amount of current being drawn from the user device 106.

As depicted, the components of the power adapter 110 may receive power from the mains power 108, and output power to the user device 106. Following the flow of power from the source (e.g., mains power 108), to the load (e.g., user device 106), the power adapter 110 generally includes an AC voltage input stage 202 where the mains power 108 provides an input AC voltage (e.g., 110 volts AC, 220 volts AC, etc.) to the power adapter 110, such as by a wall outlet connected to a power grid. The power adapter 110 may further include a power stage 204 where the input AC voltage input stage 202 has the voltage modified into a DC voltage, a control stage 206 where the DC voltage received from the power stage 204 is further modified or controlled (e.g., the voltage is stepped up, stepped down, etc.) and provided to a DC voltage output stage 208 where a final DC voltage is provided to the user device 106 in order for the user device 106 to drawn current, and thus power, from the power adapter 110.

In some examples, the power stage 204 may transform and rectify the AC voltage input received from the AC voltage input stage 202, and ultimately from the mains power 108. As shown, the power stage 204 includes a transformer 210 to step down the AC voltage input signal, and also a rectifier 212 to convert the AC voltage signal into a DC voltage signal. For instance, the transformer 210 may step down the voltage from a nominal voltage of 110V-120V AC to a voltage of, for example, 20V AC. The rectifier 212, which is depicted as a bridge rectifier along with a smoothing capacitor, may convert the 20V AC voltage signal received into a 20V DC voltage signal, where the ripple in the resulting DC voltage waveform is reduced using the smoothing capacitor to hold the DC voltage more steady after being rectified by the rectifier 212. The voltage across the smoothing capacitor may then be provided to the control stage 206 as an input voltage ($V_{IN}$) which is further modified or controlled by components of the control stage 206.

The control stage 206 may include a control circuit, such as a voltage-mode control circuit, a current-mode control circuit, etc., for controlling the output of the power adapter 110. As illustrated in FIG. 2, the control stage 206 may control the DC voltage output at the DC voltage output stage 208 using a pulse-width-modulation-based buck converter. More specifically, the control stage 206 may include a pulse-width modulation (PWM) switch 214 to control the output voltage 218 that is driven by a comparator 216. Although illustrated as a single comparator, the comparator 216 may be implemented with two or more comparators. As shown, the comparator 216 determines, based on a comparison, if the output voltage ($V_{OUT}$) 218 above, or below, a reference voltage ($V_{REF}$) 220 indicating what the output voltage 218 is supposed to be. For example, if the output voltage 218 is a threshold amount higher than the reference voltage 220, then the comparator 216 may cause the PWM switch 214 to drop from driving, which in turn causes the output voltage 218 to drop back near the desired reference voltage 220. In some examples, $V_{REF}$ 220 may be a voltage across a precision shunt to ensure that $V_{REF}$ is a substantially fixed voltage. Although illustrated as being separate from the PWM switch 214, the oscillator may be embedded in the PWM switch 214.

Generally, the PWM switch 214 may have two main components that model its behavior, namely, a duty cycle and an on/off cycle (e.g., frequency cycle). A PWM switch 214 may emit a signal based at least partly on these two components which controls the transistor 224. The on/off cycle may correspond to how fast, such as the period of time, the signal takes to complete one cycle of turning on and off the transistor 226 (e.g., opening and closing the switch). For example, control signal emitted by the PWM switch 214 which has a frequency of 1000 Hz would complete a full on/off cycle of the transistor 224 1000 times per second. The duty cycle of the PWM switch 214 may correspond to amount of time the signal is in a "high" or "on" state as a percentage of the total time it takes to complete one frequency cycle. For instance, a PWM switch 214 that has a duty cycle of 60% may cause a 20V input to be reduced to a 12V output. Thus, the on/off cycle of the PWM switch 214 may define the period of time during which the transistor 224 is opened and closed, and the duty cycle may define the ratio of the time that the switch is open or closed during the frequency cycle. In some examples, in order for the low-current-limit component 112 to detect the reduction in the amount of current drawn from the user device 106, the amount of current drawn must be dropped for more than a threshold period of time, which may correspond to twice the length of time of a normal on/off cycle of the PWM switch 214.

The PWM switch 214 may be driven by an oscillator 222, in addition to the comparator 216, to generate a PWM signal for switching or controlling a transistor 224. For example, the oscillator 222 may generate a waveform or ramp signal, such as a sawtooth or triangle waveform, which controls the transistor 224 (e.g., MOSFET, BJT, and so forth). In some examples, the error, or difference, between the reference voltage 220 and the output voltage 218 may be compared to the ramp signal of the oscillator 222 using a second comparator in order to change the output pulse of the PWM switch 214. Stated otherwise, the voltage error, determined using the comparator 216, between the reference voltage 220 and the output voltage 218 is compared with the ramp signal of the oscillator 222 to adjust the duty cycle of the PWM switch to drive the transistor 224 to modify the DC input voltage 226 received from the rectifier 212 to the desired output voltage 218 (e.g., reference voltage 220 value). Thus, the transistor 224 may be driven by the PWM switch 214 to open and close in order to, either step-up or step-down, the input DC voltage 226 to the desired output voltage 218. As an example, the control stage 206 may generally comprise a PWM-based buck converter which steps-down a DC input voltage 226 (e.g., 20 volts DC) to a voltage usable by the user device 106 (e.g., 5 volts DC). In this way, the control stage 206 may control the output voltage 218 provided to the user device 106 at the DC voltage output stage 208.

In some examples, the control stage 206 may further include the low-current-limit component 112, and may also include a high-current-limit component 228. Generally, the high-current-limit component 228 may comprise an electrical and/or electromechanical component (e.g., integrated circuit) that imposes an upper current limit for the amount of current that may be delivered to the user device 106. For instance, the high-current-limit component 228 may be configured to determine that the amount of current being drawn by the user device 106 is higher than a threshold amount of current (e.g., 4 amps, 5 amps, etc.). The upper threshold amount of current may indicate that a fault is consuming power in the user device 106, rather than the device itself. If the high-current-limit component 228 determines, such as by monitoring the amount of current flowing out of the power adapter 110, that the user device 106 is drawing more than the upper threshold amount of current, then the high-current-limit component 228 may trigger a timer associated with the high-current-limit component 228 which determines whether the current is higher than threshold amount of current for more than a threshold period of time (e.g., 20 ms, 100 ms, etc.). If the timer of the high-current-limit component 228 determines that the amount of current being drawn is higher than the threshold amount of current for more than the threshold period of time, the high-current-limit component 228 may impose the overcurrent limit and turns off power to the user device 106 to prevent a dangerous device fault from continuing to draw power from the power adapter 110. Generally, the high-current-limit component 228 may comprise any type of current-limiting component, such as an integrated circuit (IC), which is configured to impose an upper current limit on the amount of current that may be drawn from the power adapter 110. In various examples, the high-current-limit component 228 may comprise the same, or similar, circuit as the low-current-limit component 112 with different timers and current detection parameters and/or thresholds.

The control stage 206 of the power adapter 110 may further include the low-current-limit component 112. As described above in FIG. 1, the low-current-limit component 112 may comprise one or more electrical components or electromechanical components, such as an integrated circuit or other hardware-based component, which is configured to prevent power from being supplied to the user device 106 if the amount of current drawn by the user device 106 is not periodically reduced to less than a threshold amount of current (e.g., 0 amperes (A), 100 mA, 200 mA, etc.). For instance, the low-current-limit component 112 of the power adapter 110 may automatically shut off power provided to the user device 106 periodically (e.g., every 15 seconds, 30 seconds, 60 seconds, etc.) unless a timer of the low-current-limit component 112 is reset within the period of time. To reset the timer of the low-current-limit component 112, the user device 106 may include logic (e.g., software-based logic, firmware-based logic, hardware-based logic, or any combination thereof) which reduces the amount of current drawn by the user device 106 to less than the threshold amount of power for a short period of time before expiration of the timer of the low-current-limit component 112 causes the power adapter 110 to shut-off power to the user device 106. For example, the timer in the low-current-limit component 112 may need to be reset every 30 seconds to prevent the low-current-limit component 112 from shutting off power to the user device 106, and the logic in the user device 106 may briefly (e.g., 20 milliseconds (ms), 100 ms, 200 ms, etc.) drop the amount of current drawn by the user device 106 within the 30 second period of time (e.g., every 15 seconds, 20 seconds, etc.) to lower than the threshold amount of current. In this way, the user device 106 is able to "tell" or notify the power adapter 110 that the user device 106 is operating normally based on the amount of current being drawn by the user device 106. Thus, as long as the amount of current drawn by the user device 106 is lowered below the threshold amount of current to reset the timer of the low-current-limit component 112 before the timer expires, the low-current-limit component 112 will not shut off power provided to the user device 106. In some examples, the low-current-limit component 112 may be configured to prevent current, and/or voltage, from being available to the user device 106 (e.g., turning off the PWM switch 214) unless the timer of the low-current-limit component 112 is reset within the threshold period of time by detecting a drop in the amount of current drawn to lower than the threshold amount of current.

In some examples, the low-current-limit component is installed internally to a housing of the power adapter 110, and in some examples, all or part of the low-current-limit component 112 may be installed external to the housing of the power adapter 110. In some examples, the period of time that the amount of current being drawn by the user device 106 must be dropped to less than the threshold amount of current may be based on a length of time for a normal on/off cycle of the control stage 206. For instance, the current may be dropped for a period of time that spans at least a normal on/off cycle, at least two times a normal on/off cycle, and so forth. For example, the on/off cycle of the transistor 224 may occur at a frequency somewhere in the range of 100 kHz and 1 MHz, and the amount of time that the current being drawn by the user device 106 must be dropped may be at least a duration of one on/off cycle, at least the duration of two on/off cycles, etc. Generally, to have reasonable closed loop current control, the power adapter 110 may perform about four current detects per on/off cycle. Thus, if the amount of current drawn by the user device 106 is lowered for two times the on/off cycle of the transistor 224, then the power adapter 110 may have been given eight opportunities to detect the drop in current from the user device 106. Thus, the low-current-limit component 112 may comprise one or more logical components, electrical components, electromechanical components, and so forth, configured to periodically (e.g., every 5 seconds, 20 seconds, etc.) determine if an amount of current drawn from the power adapter 110 and by the user device 106 drops below a threshold amount of current (e.g., 0 A, 100 mA, etc.) for more than a threshold period of time (e.g., 10 ms, 100 ms, etc.). If the amount of current drawn by the user device 106 drops below the threshold amount of current, the timer of the low-current-limit component 112 may be reset and the user device 106 may continue to draw current from the power adapter 110. However, if the amount of current does not drop below the threshold amount of current before the timer of the low-current-limit component 112 expires, then the low-current-limit component 112 may cause the power adapter to stop providing voltage and/or current to the user device 106. In this way, the user device 106 is able to "notify" the power adapter 110 that the user device 106 is able to control the amount of power being consumed, and thus operating normally and independent of a hardware- and/or firmware-based fault.

Although illustrated as having various stages and components, the power adapter 110 may be more complex, or less complex, than the power adapter 110 shown in FIG. 2. For instance, rather than having a transformer, the power adapter 110 may simply have a buck converter configured to drop the voltage from a higher DC voltage to a desired DC voltage. Further, while the power adapter 110 is shown as stepping down and converting an AC voltage to a lower DC voltage, the power adapter 110 may comprise any type of power adapter 110. For instance, the power adapter 110 may be an AC-to-DC converter DC-to-AC converter, AC-to-AC step-up or step-down adapter, DC-to-DC step-up or step-down converter, etc. Generally, the power adapter 110 may include any type or number of components that include the low-current-limit component 112 configured to shut off power to the user device 106 if the amount of current, and thus power, consumed by the user device 106 is not dropped below the threshold amount of current. In some examples, the power adapter 110 may be implemented in different arrangements, such as using a fly-back converter.

Figure 3:
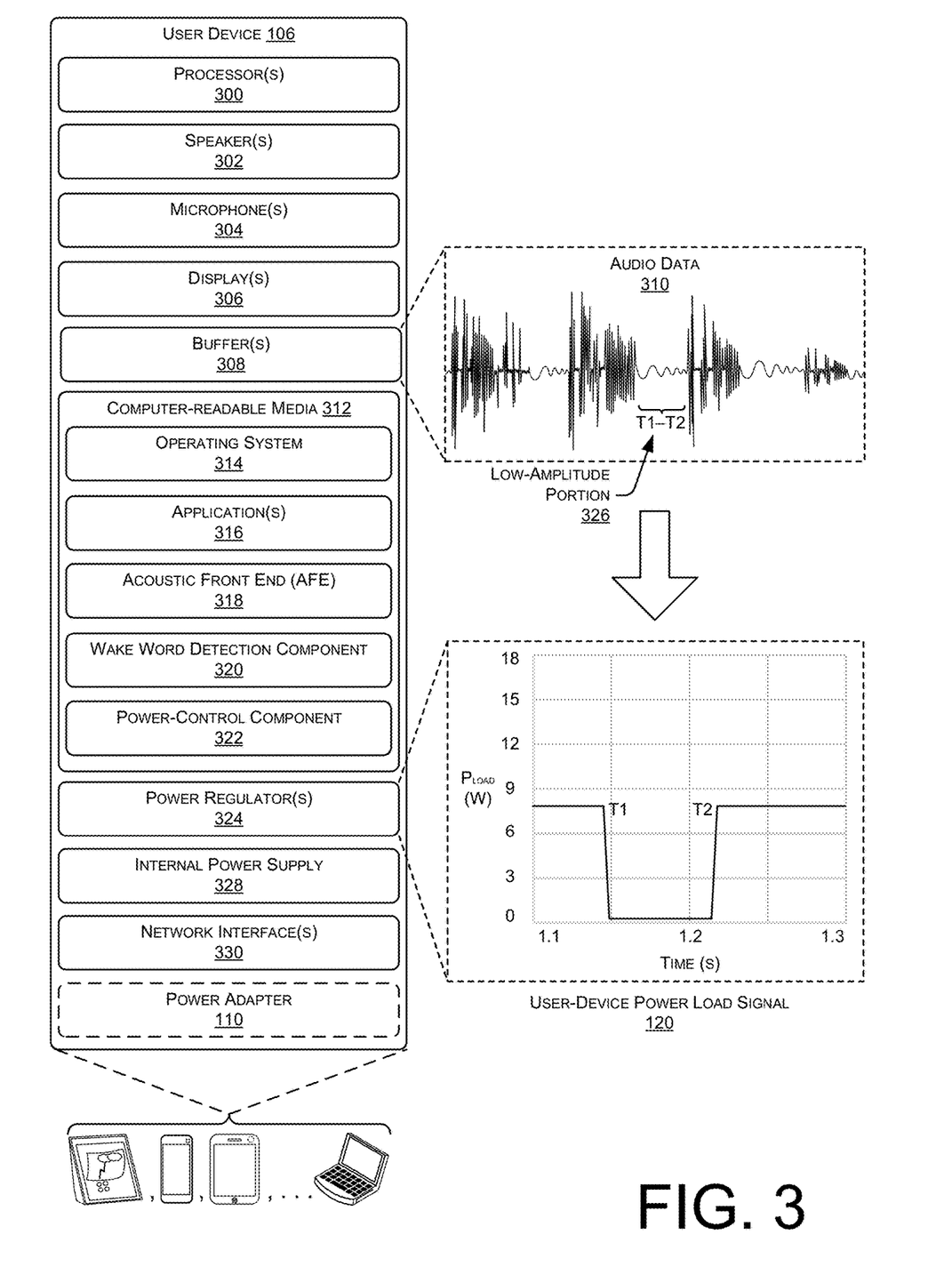
FIG. 3 illustrates a block diagram of an example architecture of a user device which includes components for periodically lowering an amount of current drawn from a power adapter to indicate to components of the power adapter that the user device is operating normally.

FIG. 3 illustrates a block diagram of an example architecture of a user device (e.g. user device 106) which includes components for periodically lowering an amount of current drawn from a power adapter (e.g., power adapter 110) to indicate to components of the power adapter that the user device is operating normally.

Generally, the user device 106 may comprise any type of device 106 and have varying functions or operations. For instance, the user device 106 may comprise a handheld device or other mobile device, such as a smartphone, a tablet computer, a media player, a personal computer (e.g., laptop computer), a wearable device, various types of accessories, or any other type of mobile computing device. The user device 106 may additionally, or alternatively, be a fixed device such as a desktop computing, a printer, a vehicle computing device, or any other type of fixed or semi-fixed computing device.

In the illustrated implementation, the user device 106 includes one or more processors 300 configured to power various components of the user device 106. Further, the user device 106 may include various hardware-based components, such as one or more speakers 302, one or more microphones 304, and one or more displays 306. The speaker(s) 302 may function as an output device to output audio sounds corresponding to audio data, which may be stored in one or more buffers 308 of the user device 106, another memory location, and/or be received from another computing device communicatively coupled to the user device 106. In some examples, the speaker(s) 302 may emit audible statements to communicate with the user 104, and the user may respond or otherwise issue voice commands, which may be captured by the microphone(s) 304. The microphone(s) 304 may function as input devices to receive audio input, such as a user 104 voice command. The microphone(s) 304 may comprise any type of component, such as a transducer, which converts sound into an electrical signal (e.g., audio data). Thus, the speaker(s) 302 may be used in conjunction with the microphone(s) 304 to facilitate a conversation with the user 104.

The user device 106 may further include the display(s) 306 to present video data or other image data. The display(s) 306 may comprise any type of electronic display known in the art. Thus, in some examples the display(s) 306 may generally function as an output device to present information, images, videos, etc., for viewing by a user 104. In some examples, the display(s) 306 may further operate as an input device and include one or more buttons and/or a touchscreen to receive touch and/or press input from the user 104. As noted above, the user device 106 may include the buffer(s) 308, which are configured to store various types of data, such as audio data (e.g., AAC, FLAC, MP3, MP4, etc.), video data (e.g., WMV, AVI, MPEG, etc.), image data, or any other type of data. As shown in FIG. 3, the buffer(s) 308 may be storing audio data 310, such as a portion of an audio data file, which may be stored temporarily in the buffer(s) 308 before being output using the speaker(s) 302.

In some examples, the user device 106 may further include computer-readable media 312 which stores various software components, firmware components, or combinations thereof. The components stored in the computer-readable media may comprise computer-readable instructions (e.g., software, firmware, a combination thereof, etc.) which configured the processor(s) 300 to perform various operations. The computer-readable media 312 may store an operating system 314 configured to manage hardware, software, firmware, and/or other systems and services within and coupled to the user device 106. The computer-readable media 312 may additionally store one or more applications 316, such as music playing applications, movie playing applications, timer applications, or any other type of applications. The application(s) 316 may be configured to play songs or other audio data/files, movies or other audio visual media, providing functions of a timer or clock, and so forth. For instance, the application(s) 316 may cause the processor(s) 300 to output audio data using the speaker(s) 302, output image data using the display(s) 306, etc.

The computer-readable media 312 may further include an acoustic front end (AFE) 318 for processing audio data generated by the microphone(s) 304, and also include a wake word detection component 320 to detect a wake word by performing wake word detection on the audio data captured by the microphone(s) 304. The AFE 318 may include an acoustic echo cancellation or suppression component for reducing acoustic echo generated by acoustic coupling between the microphone(s) 304 and speaker(s) 302 of the user device 106, or speakers of other devices in an environment of the user device 106. The AFE 318 may also include a noise reduction component for reducing noise in received audio signals, such as elements of microphone audio signals other than user speech. The AFE 318 may include one or more audio beamformers or beamforming components configured to generate directional audio signals that are focused in different directions. More specifically, the beamforming components may be responsive to audio signals from spatially separated microphone elements of the microphone(s) 304 to produce directional audio signals that emphasize sounds originating from different areas of the environment of the user device 106 or from different directions relative to the user device 106.

The wake word detection component 320 may comprise computer-readable instructions configured to detect a wake word by performing wake word detection on the audio data, generated by the microphone(s) 304, within which voice activity has been detected or on a directional audio signal within which the highest level of voice activity has been detected. For example, a predefined word, expression, or other sound can be used as a signal that the user 104 intends subsequent speech to be received and acted upon by the user device 106. In some examples, the wake word detection may be implemented using keyword spotting technology. A keyword spotter may comprise a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In some cases, a keyword spotter may use simplified ASR (automatic speech recognition) techniques. For example, the wake word detection component 320 may use a Hidden Markov Model (HMM) recognizer that performs acoustic modeling of an audio signals and compares the HMM model to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models.

The wake word detection may also use a support vector machine (SVM) classifier that receives the one or more feature scores produced by the HMM recognizer. The SVM classifier produces a confidence score indicating the likelihood that an audio signal contains the trigger expression. The user device 106 may begin storing and/or streaming audio data upon detecting a predefined wake word using the wake word detection component 320.

The computer-readable media 312 may further store a power-control component 322 to perform various operations for controlling power accepted, or drawn, by the user device 106. For example, the power-control component 322 may be configured to control (e.g., turn on, turn off, etc.) one or more power regulator(s) 324 of the user device 106. In some examples, the power regulator(s) 324 may comprise hardware-based regulators which cause the user device 106 to stop accepting current, and/or reduce the amount of current, drawn by the user device 106, such as an enable pin of the user device 106, an I2C control of the user device 106, or any other component for regulating the amount of power/current drawn and consumed by the user device 106.

In various examples, the power-control component 322 may comprise instructions, such as firmware and/or software, which selectively uses the power regulator(s) 324 to allow the user device to draw current, reduce the amount of current drawn/accepted by the user device 106, and/or prevent current from being drawn/accepted by the user device 106. In some examples, the power-control component 322 may include a timer (e.g., software-based and/or firmware-based time), or monitor a timer (e.g., hardware-based timer), and using the timer, periodically reduce an amount of current being drawn by the user device 106, or altogether stop current from being drawn by the user device 106. Generally, the timer associated with the power-control component 322 may be set for, or determine, a period of time that is less than, or equal to, the period of time set using the timer of the low-current-limit component 112 of the power adapter 110 at which the low-current-limit component 112 causes the power adapter 110 to stop providing power to the user device 106. For instance, a timer of the low-current-limit component 112 may cause the low-current-limit component 112 to stop the power adapter 110 from providing current/power to the user device 106 if the user device 106 has not reduced the amount of power drawn to less than the threshold amount of power within the period of time.

For example, the timer of the low-current-limit component 112 may be set for 30 seconds, and if the user device 106 does not lower the amount of current drawn from the power adapter 110 to less than the threshold amount of current (e.g., 0 A, 100 mA, 200 mA, etc.) for a threshold period of time to allow the low-current-limit component 112 to detect the drop in current/power, the low-current-limit component 112 may cause the power adapter 110 to stop providing power to the user device 106 after expiration of the 30 seconds. In such an example, the power-control component 322 may be configured or otherwise programmed to periodically (e.g., 10 seconds, 15 seconds, etc.) lower the amount of current drawn by the user device 106 from the power adapter 110 to less than the threshold amount of current for the threshold period of time in order to reset the timer of the low-current-limit component 112 before the 30 seconds expires and shuts off power to the user device 106. In some examples, the period of time that the amount of current being drawn must be dropped to lower than the threshold amount of current may be based on a frequency cycle of the control stage 206. For example, if the PWM switch 214 of the power adapter 110 causes the transistor 224 to switch at a particular switching frequency (e.g., 100 kHz, 1 MHz, etc.), the power-control component 322 may reduce the amount of current drawn by the user device 106 for at least a period of time that is greater than, or equal to, a period of time of the frequency cycle to ensure the low-current-limit component 112 detects the drop in current drawn to reset its timer. However, any period of time for dropping the amount of current drawn at the user device 106 may be used as long as the low-current-limit component 112 is able to detect the drop in current below the threshold amount of current and reset its timer.

Thus, the power-control component 322 may be configured to selectively use (e.g., activate or turn on, deactivate or turn off, etc.) the power-regulator(s) 324 to periodically reduce the amount of current drawn by the user device 106 to less than the threshold amount of current. In some examples, the user device 106 may include various types of internal power supplies 328, such as one or more capacitors. For instance, a capacitor, multiple capacitors, one or more banks of capacitors, etc., may be used to supply power to components of the user device 106 (e.g., speaker(s) 302, microphone(s) 304, display(s) 306, buffer(s) 308, etc.). In such examples, the power being drawn from the power adapter 110 during normal operation of the user device 106 may charge these capacitors to a desired voltage to power the components of the user device 106. During the period of time that the power-control component 322 causes the power regulator(s) 324 to reduce the amount of current drawn by the user device 106, the capacitors of the internal power supply 328 may be capable of powering operations of the user device 106 while the user device 106 is receiving relatively little power, or no power at all. Thus, the capacitors of the internal power supply 328 may discharge to power the components of the user device 106 during the reduced current time period such that the user 104 of the user device 106 experiences little, or no, reduction in user experience, and the capacitors of the internal power supply 328 may then be recharged once the power-control component 322 allows the device 106 to resume receiving or drawing normal amounts of current from the power adapter 110. In this way, the user device 106 is able to continue to perform various operations which the user device 106 is drawing little or no current from the power adapter, such as outputting video data using the display(s) 306, outputting audio data using the speaker(s) 302, transmitting data captured by at least one of the microphone(s) 304 (or a camera of the user device 106) over a network and to another device, receiving data over a network and from another device, generating audio data corresponding to sound captured by the microphone(s) 304, or any other operation the user device 106 is able to perform.

In some examples, the internal power supply 328 may comprise one or more input-voltage capacitors which provide voltages for different components of the user device 106. For instance, the display 306 may operate using a different input voltage than the speakers 302. Accordingly, the internal power supply 328 may comprise input-voltage capacitors that provide an input voltage for the components of the user device 106. In such examples, the input-voltage capacitors may remain charged using current drawn during normal operation of the user device 106. However, when the user device 106 periodically reduces the amount of current drawn, or stops accepting current, the input-voltage capacitors may supply the various components with the necessary power during the low-current period of time. For instance, the speakers 302 may be outputting audio data 310, and the amount of current drawn during the period of time that the current being drawn is reduced may be less than an amount of current to operate the speaker 302. Accordingly, the input-voltage capacitors that are connected to the speakers 302 may provide the additional current required to operate the speakers 302 by discharging for the periods of time when the current being drawn from the power adapter 110 is reduced.

In some examples, the power-control component 322 may further perform various types optimization techniques for determining a time at which to lower the amount of current drawn from the power adapter 110. For example, outputting audio data using the speaker(s) 302 of the user device 106 may be a relatively high-power consuming activity for the user device 106. To ensure that the capacitors of the internal power supply 328 which power the microphone(s) 304 during the current reduction time periods are able to continue outputting the audio data, the power-control component 322 may analyze the audio data 310 stored in the buffer(s) 308, or otherwise identify from the audio data 310, a low-amplitude portion 326 or segment of the audio data 310 that is to be output. For instance, the user device 106 may store or buffer a portion of the audio data 310 prior to outputting the audio data 310. The audio data 310 may be buffered for various reasons, such as echo cancellation and/or to ensure that losses in network access when streaming the audio data 310 do not affect output of the audio data 310. The power-control component 322 may determine a low-amplitude portion 326 of the audio data 310, such as a portion of the audio data 310 that is lower than some threshold amplitude, and a time in the future at which this portion 326 of the audio data 310 is to be output by the speaker(s) 302.

In some examples, the power-control component 322 may include an algorithm configured to determine the low power points in the audio data 310. In some examples, the power-control component 322 may determine the low-power points using an audio codec associated with the audio data 310. For instance, MP3 may be decoded and/or decompressed using, at least partly, fast-Fourier transforms (FFT) which may be used to identify low-power points relative to higher power points in the audio data 310. Thus, in examples where the user device 106 is outputting audio data 310 using the speaker(s) 302, the power-control component 322 may determine to reduce the amount of current drawn from the power adapter at a point in time at which the low-amplitude portion 326 of the audio data 310 stored in the buffer(s) 308 will be output. As shown in FIG. 3, the low-amplitude portion 326 may correspond to a time, or a time period, at which the amount of current, and thus power, is reduced at the user device 106, as shown in the user-device power load signal 120 illustration. In some examples, the audio data 310 may be broken into and represented by a series of sine waves that each have a magnitude and a frequency component. In some examples, the power-control component 322 may identify the low-amplitude portion 326 based on the signal coefficients of the audio data, such as amplitude components and/or frequency components of the sine waves representing the low-amplitude portion 326 resolving to zero. For example, the power-control component 322 may determine that the frequency or signal coefficients for the $1^{st}$, $3^{rd}$, and $5^{th}$ frequencies resolve or converge to zero. In some examples, the audio codecs used to encode/decode, or compress/decompress, may be utilized to identify the low-amplitude portions 326. Although described as being used for audio data 310, the techniques described herein may similarly be used for identifying low-power portions of video data to be output by the user device 106. For example, each keyframe in video data may correspond or include waveform deviations in time (e.g., x, y, and z deviations). If the slope representing the deviations is low, then the amount of power required to output that frame may also be low.

The user device 106 may further include one or more network interfaces 330 that may be utilized by the user device 106 to communicate with other devices over networks, such as the network(s) 122. Generally, the network interface(s) enable the user device 16 to communicate over any type of network, such as a wired network (e.g., USB, Auxiliary, cable etc.), as well as wireless networks (e.g., WiFi, Bluetooth, Personal Area Networks, Wide Area Networks, and so forth). In some examples, the network interface(s) 330 may include a wireless unit coupled to an antenna to facilitate wireless connection to a network. However, the network interface(s) may include any type of component (e.g., hardware, software, firmware, etc.) usable by the user device 106 to communicate over any type of wired or wireless network. The network interface(s) 330 may enable the user device 106 to communicate over networks such as a wireless or Wi-Fi network communications interface, an Ethernet communications interface, a cellular network communications interface, a Bluetooth communications interface, etc., for communications over various types of networks 122, including wide-area network, local-area networks, private networks, public networks etc. In the case of a wireless communications interfaces, such interfaces 330 may include radio transceivers and associated control circuits and logic for implementing appropriate communication protocols.

As shown in FIG. 3, the power adapter 110 may optionally be included in a housing of the user device 106. For instance, the user device 106 may receive power directly from the mains power 108 (or other power source) through a power cable and pass through the power adapter 110 once received at the user device 106. In some examples, the power adapter 110 may be magnetically and/or at least partly electrically isolated from the other components of the user device 106. For instance, the power adapter 110 may surrounded by magnetic isolation materials which prevent any magnetic fields (e.g., emitted from a transformer 210) from interfering with other components of the user device 106, such as transmission of data using the network interface(s) 330 over a network. Thus, the components of the power adapter 110 may be located external to the user device 106, internal to the user device 106 housing, and/or partly external and internal to the user device 106 depending on the configuration of the power adapter 110 and the user device 106.

Depending on the configuration and type of the user device 106, the user device 106 may further include or be associated with other components, such as keyboards, a mouse, one or more light emitting diodes (LEDs), various sensors (e.g., accelerometers, GPS, gyroscopes, etc.), or any other component.

In some implementations, the processors(s) 128 and 300 may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) 128 and 300 may possess its own local memory, which also may store program modules, program data, and/or one or more operating systems. The processors(s) 128 and 300 may be located in a single device or system, or across disparate devices or systems, which may be owned or operated by various entities.

The computer-readable media 130 and 312 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 130 and 312 may be implemented as computer-readable storage media ("CRSM"), which may be any available physical media accessible by the processor(s) 128 and/or 300 to execute instructions stored on the memory 130 and 312. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 130 and 312.

Figure 4:
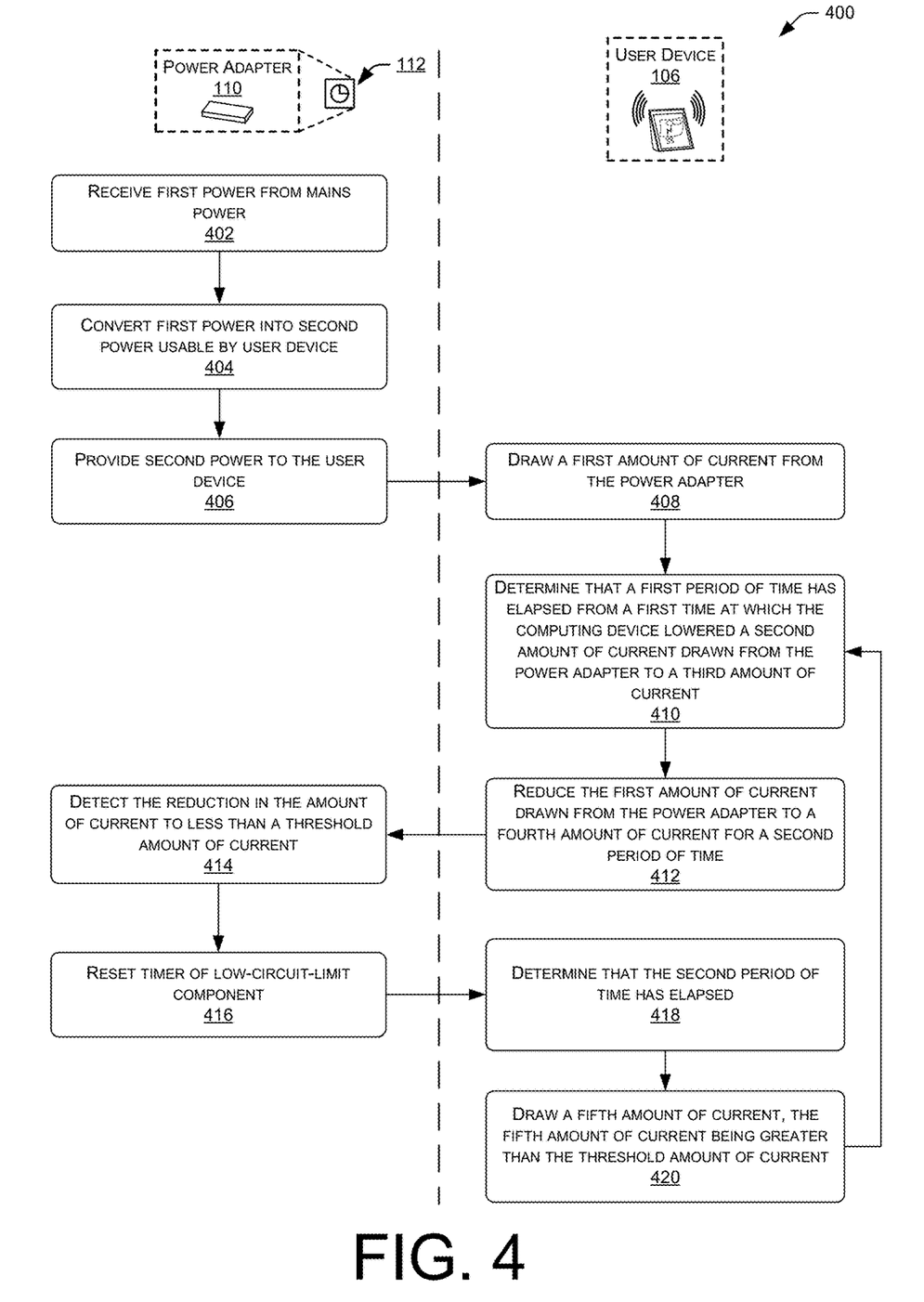
FIG. 4 illustrates a flow diagram of an example method, performed at least partly by a power adapter and a user device, for detecting a device fault in a user device.

FIG. 4 illustrates a flow diagram of an example method 400, performed at least partly by a power adapter and a user device, for detecting a device fault in a user device. In some examples, the techniques may be performed by the power adapter 110 and its components, as well as the user device 106 and its components.

At 402, the power adapter 110 may receive first power from mains power. For example, the power adapter 110 may receive AC power via a power cable from mains power 108. In various examples, the first power received from mains power 108 may be power received from a power grid (e.g., 120V AC, 240V AC, etc.), but in other examples, the first power received may be in any format and from any power source.

At 404, the power adapter 110 may convert the first power into second power that is usable by the user device 106. For instance, the power adapter 110 may include components which modify the voltage, such as by changing AC power to DC power. Further, the power adapter 110 may step-up or step-down the voltage received from mains power 108, such as stepping down a voltage from 120 volts to 5 volts, or any other voltage at which the user device 106 operates. At 406, the power converter 110 may provide the second power to the user device 106. For instance, the power adapter 110 may allow the user device 106 to draw current at the modified voltage.

At 408, the user device 106 may draw or accept a first amount of current from the power adapter 110. For example, the power-control component 322 may, using the power regulator(s) 324, allow the user device 106 to drawn the first amount of current from the power adapter 110 to power operations of the user device 106.

At 410, the user device 106 may determine that a first period of time has elapsed from a first time at which the user device 106 lowered a second amount of current drawn from the power adapter to a third amount of current. For example, a timer associated with the power-control component 322 may have expired, where the timer indicates periodic times at which the user device 106 is to drop the amount of current drawn to an amount that is less than a threshold amount of current to reset a timer of the power adapter 110. Thus, at 410, the power-control component 322 may determine that the timer has, or is going to, expire from the last time the power-control component 322 lowered the second amount of current to the third amount of current, where the third amount of current is less than the threshold amount of current to reset the timer of the power adapter 110.

At 412, the user device 106 may reduce the first amount of current drawn from the power adapter 110 to a fourth amount of current for a second period of time. in some examples, the user device 106 reduces the current drawn to the fourth amount of current based at least in part on determining that the first period of time has elapsed. The fourth amount of current may be less than the threshold amount of current to reset the timer of the power adapter 110.

During the second period of time, the user device 106 may perform various operations. For example, the user device 106 may perform one or more of: outputting video data using a display(s) 306 at least partly powered by the user device 106, outputting audio data using a speaker(s) 302 powered at least partly by the user device 106, receiving data over a network using a network interface(s) 330 powered at least partly the user device 106, generate audio data corresponding to a speech utterance of a user using a microphone (s) 304 powered at least partly by the user device 106, and/or any other type of activity user devices 106 may be configured for.

At 414, the power adapter 110 may detect the reduction in the amount of current drawn by the user device 106 to less than the threshold amount of current. In such examples, at 416, the power adapter 110 may reset or restart the timer of the low-circuit-limit component 112, which in turn allows the user device 106 to continue to draw power from the power adapter 110. At 416, the low-circuit-limit component 112 of the power adapter 110 may reset the timer of the low-cruit-limit component 416.

At 418, the user device 106 may determine that the second period of time has elapsed. For example, the power-control component 322 may determine that the second period of time that the amount of current drawn must be dropped to lower than the threshold amount of current has elapsed. Based on determining that the second period of time has elapsed, at 420, the user device 106 may draw a fifth amount of current from the power adapter 110. For example, the power-control component 322 may use the power regulator (s) 324 to allow the user device 106 to draw or accept the fifth amount of current from the power adapter 110, where the fifth amount of current is greater than the threshold amount of current.

Figure 5:
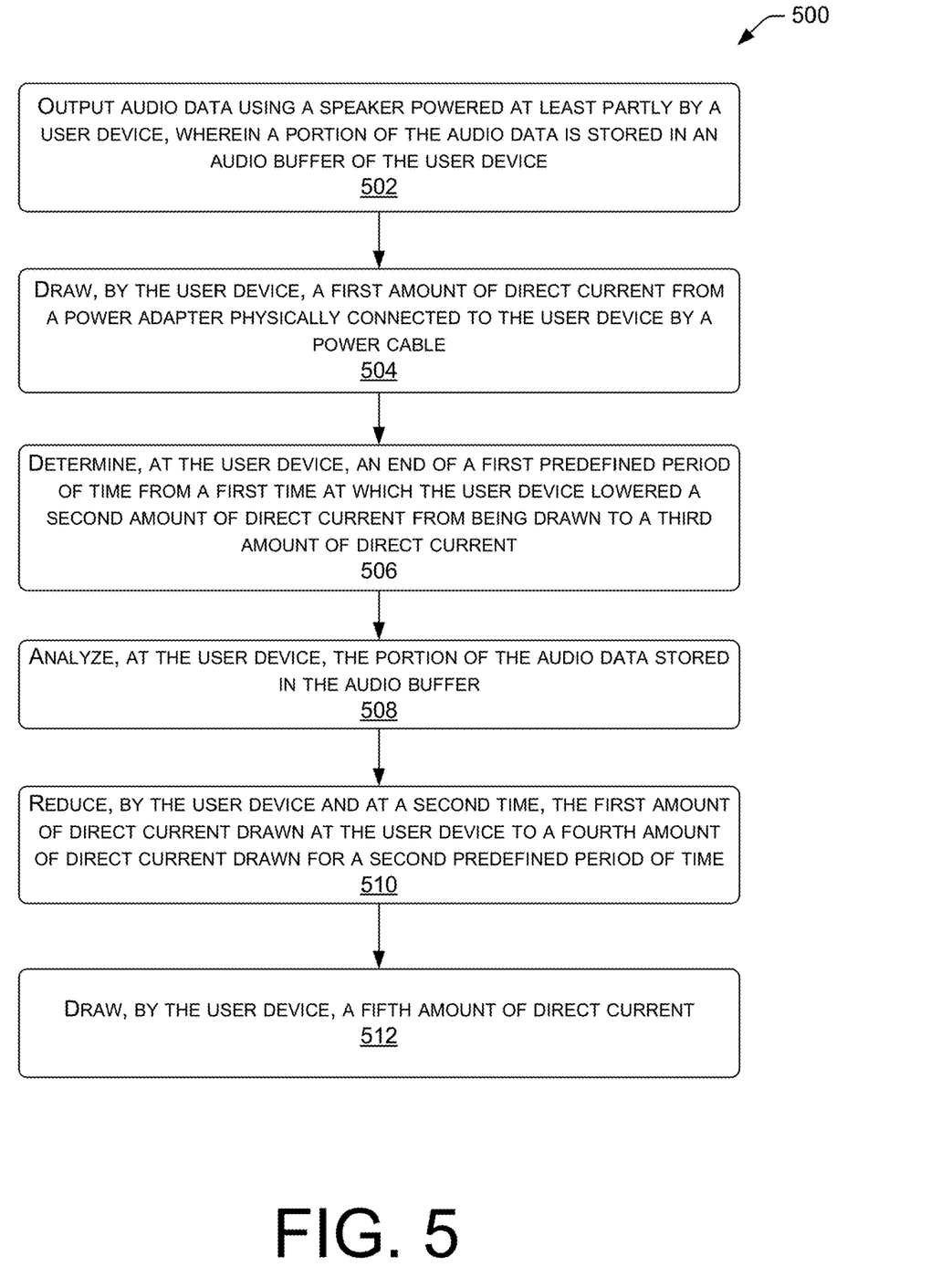
FIG. 5 illustrates a flow diagram of an example method for detecting a device fault in a user device where the user device determines a time to reduce an amount of current drawn from a power adapter based on analyzing audio data.

FIG. 5 illustrates a flow diagram of an example method 500 for detecting a device fault in a user device where the user device determines a time to reduce an amount of current drawn from a power adapter based on analyzing audio data. In some examples, the operations of method 500 may be performed by components of the user device 106.

At 502, the user device may output audio data 310 using a speaker 302 powered at least partly by the user device 106. In some examples, at least a portion of the audio data 310 is stored in an audio buffer (e.g., buffer(s) 308) of the user device 106. At 504, the user device may draw a first amount of direct current from a power adapter 110 physically connected to the user device 106 by a power cable. For instance, the power-control component 322 may use the power-regulator(s) 324 to allow the user device 106 to drawn the first amount of direct current.

At 506, the user device 106 may determine or detect an end of a first predefined period of time from a first time at which the user device 106 lowered a second amount of direct current being drawn to a third amount of direct current. For instance, the timer associated with the power-control component 322 may have expired, or be expiring soon. In some examples, the third amount of direct current is less than a threshold amount of direct current which indicates to the power adapter 110 that the user device 106 is operating independent of a power fault.

At 508, the user device 106 may analyze the portion of the audio data 310 stored in the audio buffer 308. In some examples, analyzing the portion of the audio data 310 may include identifying, from the portion of the audio data 310, a segment of audio data (e.g., low-amplitude portion 326) having a signal amplitude that is lower than a threshold signal amplitude. In such examples, the determining that the second time at which the first amount of direct current drawn at the user device 106 is reduced to the fourth amount of direct current is associated with a period of time during which the segment of the audio data is output using the speaker 302.

At 510, the user device 106 may, based at least in part on the end of the first predefined time period and on analyzing the portion of the audio data, reduce, at a second time, the first amount of direct current drawn at the user device to a fourth amount of direct current for a second predefined period of time. In some examples, the fourth amount of direct current may be less than the threshold amount of direct current, and the user device 106 may be outputting the audio data 310 using a speaker 302 while the fourth amount of direct current is drawn by the user device 106.

At 512, the user device may, based at least in part on an end of the second predefined period of time, draw a fifth amount of direct current, where the fifth amount of direct current is higher than the threshold amount of direct current. For instance, the power-control component 322 may use the power regulator(s) 324 to allow the user device 106 to draw the fifth amount of direct current from the power adapter 110 to power operations of the user device 106.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method performed at least partly at a user device for detecting power faults in the user device, the method comprising:

drawing, by the user device, a first amount of current from a power adapter physically connected to the user device;

reducing, by the user device and for a first period of time, the first amount of current drawn to a second amount of current, wherein the second amount of current is less than a threshold amount of current, wherein the threshold amount of current represents a minimum current to prevent reset of a first timer of the power adapter;

drawing, by the user device, a third amount of current from the power adapter, wherein the third amount of current is higher than the threshold amount of current;

setting, by the user device, a second timer of the user device for a second period of time;

determining, at least partly using the second timer, that the second period of time has elapsed; and drawing, by the user device and for the first period of time a fourth amount of current, wherein the fourth amount of current is less than the threshold amount of current.

2. The computer-implemented method as recited in claim 1, further comprising:

identifying, by the user device, a portion of audio data having a signal coefficient that is lower than a threshold signal coefficient, the audio data being stored in the user device and wherein the signal coefficient that is less than the threshold signal coefficient resolves to zero and corresponds to a low-power point; and wherein drawing the fourth amount of current is further based at least in part on a time at which the portion of the audio data is being output by the user device.

3. The computer-implemented method as recited in claim 1, wherein the first period of time is greater than or equal to a third period of time, and wherein the third period of time corresponds to an on/off cycle for a switch of the power adapter.

4. A computing device comprising:

one or more processors;

a power regulator component configured to selectively draw current from a power adapter, wherein the power regulator draws a first amount of current from the power adapter; and one or more non-transitory computer-readable media storing computer-executable instructions that, when executed by the one or more processors, cause the one or more processors to perform operations comprising:

drawing, for a first period of time, a second amount of current, wherein the second amount of current is less than the first amount of current and a threshold amount of current;

setting a timer associated with the computing device for a second period of time;

drawing a third amount of current from the power adapter, wherein the third amount of current is higher than the threshold amount of current;

determining that the second period of time has elapsed; and drawing a fourth amount of current, wherein the fourth amount of current is less than the third amount of current and the threshold amount of current.

5. The computing device as recited in claim 4, wherein:

the timer associated with the computing device comprises a first timer;

the power adapter comprises a second timer that is set for a third period of time; and the second period of time is less than the third period of time.

6. The computing device as recited in claim 4, the operations further comprising performing, at least partly during the first period of time:
  outputting, using a speaker of the computing device, audio data;
  wherein:
    the speaker consumes a fifth amount of current that is greater than the second amount of current drawn from the power adapter during the first period of time, and
    one or more input-voltage capacitors connected to the speaker discharge during the first period of time to provide at least a portion of the fifth amount of current to the speaker.

7. The computing device as recited in claim 4, further comprising a speaker, and the operations further comprising:
  identifying a portion of audio data having a signal amplitude that is less than a threshold signal amplitude, the audio data being stored in the computing device and wherein the signal amplitude that is less than the threshold signal amplitude corresponds to a low-power point in the audio data; and
  wherein drawing the fourth amount of current is performed at least in part on a time at which the portion of the audio data is output by the speaker.

8. The computing device as recited in claim 4, further comprising a speaker, and the operations further comprising:
  identifying a portion of audio data having a signal coefficient that is less than a threshold signal coefficient, wherein the signal coefficient that is less than the threshold signal coefficient resolves to zero and corresponds to a low-power point in the audio data; and
  wherein drawing the fourth amount of current is performed at least in part on a time at which the portion of the audio data is output by the speaker.

9. The computing device as recited in claim 4, wherein:
  the first period of time is greater than or equal to a third period of time; and
  the third period of time corresponds to an on/off cycle for a switch of the power adapter.

10. The computing device as recited in claim 4, wherein the second amount of current comprises zero current.

11. The computing device as recited in claim 4, wherein:
  the first period of time is greater than or equal to a third period of time; and
  the third period of time corresponds to two times of a duration of an on/off cycle for a switch of the power adapter.

12. A method comprising:
  drawing, at an electronic device, a first amount of current from a power adapter associated with the electronic device;
  reducing, by the electronic device and for a first period of time, the first amount of current drawn to a second amount of current, wherein the second amount of current is less than a threshold amount of current;
  setting a timer associated with the electronic device for a second period of time;
  drawing, at the electronic device, a third amount of current that is greater than the threshold amount of current;
  determining, at least partly using the timer, that the second period of time has elapsed; and
  drawing a fourth amount of current, wherein the fourth amount of current is less than the threshold amount of current.

13. The method as recited in claim 12, further comprising causing, at least partly during the first period of time, the electronic device to:
  output, using a speaker of the electronic device, audio data;
  wherein:
    the speaker consumes a fifth amount of current that is greater than the second amount of current drawn from the power adapter during the first period of time, and
    one or more input-voltage capacitors connected to the speaker discharge during the first period of time to provide at least a portion of the fifth amount of current to the speaker.

14. The method as recited in claim 12, further comprising:
  identifying a portion of audio data having a signal amplitude that is less than a threshold signal amplitude, the audio data being stored in the electronic device and wherein the signal amplitude that is less than the threshold signal amplitude corresponds to a low-power point in the audio data; and
  wherein drawing the fourth amount of current is performed at least in part on a time at which the portion of the audio data is output by a speaker of the electronic device.

15. The method as recited in claim 12, further comprising:
  identifying a portion of audio data having a signal coefficient that is less than a threshold signal coefficient, wherein the signal coefficient that is less than the threshold signal coefficient resolves to zero and corresponds to a low-power point in the audio data; and
  wherein drawing the fourth amount of current is performed at least in part on a time at which the portion of the audio data is output by a speaker of the electronic device.

16. The method as recited in claim 15, further comprising:
  decoding the audio data using an audio codec associated with the audio data; and
  wherein identifying the portion of the audio data associated with the signal coefficient that is less than the threshold signal coefficient is performed at least in part based on decoding the audio data using the audio codec.

17. The method as recited in claim 12, wherein:
  the first period of time is greater than or equal to a third period of time; and
  the third period of time corresponds to an on/off cycle of a switch of the power adapter.

18. The method as recited in claim 12, wherein the second amount of current comprises zero current.

19. The method as recited in claim 12, wherein:
  the first period of time is greater than or equal to a third period of time; and
  the third period of time corresponds to two times of a duration of an on/off cycle for a switch of the power adapter.

20. The method as recited in claim 12, wherein:
  the timer associated with the electronic device comprises a first timer;
  the power adapter comprises a second timer that is set for a third period of time; and
  the second period of time is less than the third period of time.

* * * * *